(12) United States Patent
Andersson et al.

(10) Patent No.: US 12,102,238 B2
(45) Date of Patent: Oct. 1, 2024

(54) CHAIR AND A KIT OF PARTS CONFIGURED TO BE ASSEMBLED INTO A CHAIR

(71) Applicant: IKEA SUPPLY AG, Pratteln (CH)

(72) Inventors: Benny Andersson, Almhult (SE); Peter Mansson, Killeberg (SE)

(73) Assignee: IKEA SUPPLY AG, Pratteln (CH)

(*) Notice: Subject to any disclaimer, the term of this patent is extended or adjusted under 35 U.S.C. 154(b) by 595 days.

(21) Appl. No.: 17/274,476

(22) PCT Filed: Sep. 10, 2019

(86) PCT No.: PCT/SE2019/050847
§ 371 (c)(1),
(2) Date: Mar. 9, 2021

(87) PCT Pub. No.: WO2020/055311
PCT Pub. Date: Mar. 19, 2020

(65) Prior Publication Data
US 2022/0047082 A1    Feb. 17, 2022

(30) Foreign Application Priority Data
Sep. 11, 2018 (SE) .................... 1851071-9

(51) Int. Cl.
*A47C 4/02* (2006.01)
*F16B 12/10* (2006.01)
(Continued)

(52) U.S. Cl.
CPC ............... *A47C 4/02* (2013.01); *F16B 12/30* (2013.01); *F16B 12/52* (2013.01); *F16B 2012/106* (2013.01)

(58) Field of Classification Search
CPC .. A47C 4/02; A47C 7/42; A47C 4/021; A47C 7/4024; A47C 4/022; F16B 12/30;
(Continued)

(56) References Cited

U.S. PATENT DOCUMENTS 4,116,573 A     9/1978 Fuchs
4,261,665 A *   4/1981 Hsiung .................. F16B 12/14
                                                            403/219
(Continued)

FOREIGN PATENT DOCUMENTS

CN      101417625 A     4/2009
CN      201564058 U     9/2010
(Continued)

OTHER PUBLICATIONS

International Search Report for International Application No. PCT/SE2019/050841 mailed Oct. 14, 2019 (4 pages).
(Continued)

*Primary Examiner* — David R Dunn
*Assistant Examiner* — Tania Abraham
(74) *Attorney, Agent, or Firm* — Merchant & Gould P.C.

(57) ABSTRACT

The disclosure relates to a chair (1) comprising a back rest (10), two legs (20*a*, 20*b*), and a third part (30) comprising two corner pieces (31*a*, 31*b*, 31*a'*), wherein the back rest (10) comprises two elongated connection members (11*a*, 11*b*) each provided with a hole (12*a*) extending along a crossing direction (T) and being provided with an interconnecting portion (13*a*), wherein the respective leg (20*a*, 20*b*) is provided with a first bore (21*a*) extending along the longitudinal direction (L) and a second bore (22*a*) extending along the crossing direction (T) and connecting with the first bore (21*a*), wherein the first bore (21*a*) is configured to receive a portion of the respective elongated connection member (11*a*), wherein the respective corner piece (31*a*, 31*a'*) is provided with a through-going hole (32*a*) or recess (32*a'*) being configured to be in register with the hole (12*a*) of the respective elongated member (11*a*) and the second bore (22*a*) of the respective leg (20*a*, 20*b*), wherein the chair (1) further comprises a first and a second fastening arrange- (Continued)

ment (40) each having a head (41) and an elongated part (42) extending through the through-going hole (32a) or recess (32a') and through the second bore (22a) and into the hole (12a) of the respective elongated connection member (11a), the respective elongated part (42) engaging with the interconnecting portion (13a) of the hole (12a) of the respective elongated connection member (11a) and thereby interconnecting the back rest (10), the legs (20a, 20b) and the corner pieces (31a, 31b, 31a'). The disclosure also relates to a kit of parts configured to be assembled into a chair.

12 Claims, 7 Drawing Sheets

(51) Int. Cl.
  *F16B 12/30* (2006.01)
  *F16B 12/52* (2006.01)
(58) Field of Classification Search
  CPC .... F16B 12/52; F16B 2012/106; F16B 12/14; F16B 12/44; F16B 2012/145
  See application file for complete search history.

(56) References Cited

U.S. PATENT DOCUMENTS

| | | | | |
|---|---|---|---|---|
| 4,691,965 | A * | 9/1987 | Hsiung | A47C 3/00 297/440.1 |
| 4,904,022 | A * | 2/1990 | Morozzi | A47C 3/00 248/188.91 |
| 5,350,218 | A * | 9/1994 | Perkins | A47C 3/029 297/440.1 |
| 5,429,417 | A * | 7/1995 | Kim | A47B 47/005 403/197 |
| 5,795,029 | A * | 8/1998 | Ma | A47C 7/42 297/440.16 |
| 6,017,092 | A * | 1/2000 | Lee | A47C 3/00 248/188 |
| 6,296,315 | B1 | 10/2001 | Jensen | |
| 7,040,607 | B2 | 5/2006 | Hutchinson | |
| 7,677,830 | B1 * | 3/2010 | Brown | F16B 12/46 403/231 |
| 7,861,339 | B2 | 1/2011 | Harrow | |
| 10,457,167 | B2 | 10/2019 | Mochizuki et al. | |
| 2003/0052524 | A1 | 3/2003 | Chiang | |
| 2006/0049681 | A1 * | 3/2006 | Diedrich | F16B 12/40 297/440.21 |
| 2009/0108662 | A1 | 4/2009 | Becker et al. | |
| 2013/0009444 | A1 | 1/2013 | Wilson et al. | |
| 2014/0375102 | A1 * | 12/2014 | Ng | A47C 4/024 297/440.1 |
| 2016/0258461 | A1 | 9/2016 | Muller et al. | |
| 2016/0345739 | A1 * | 12/2016 | McCullough | A47B 13/021 |

FOREIGN PATENT DOCUMENTS

| | | |
|---|---|---|
| CN | 102821654 A | 12/2012 |
| CN | 108394323 A | 8/2018 |
| DE | 19746304 A1 | 4/1999 |
| JP | 2002191461 A | 7/2002 |
| KR | 100994046 B1 | 11/2010 |
| KR | 101284518 B1 | 7/2013 |
| WO | 9725537 A1 | 7/1997 |

OTHER PUBLICATIONS

Extended European Search Report for EP Application No. 19860513.1 mailed May 19, 2022 (5 pages).

* cited by examiner

CHAIR AND A KIT OF PARTS CONFIGURED TO BE ASSEMBLED INTO A CHAIR

This application is a National Stage Application of PCT/SE2019/050847, filed 10 Sep. 2019, which claims benefit of Ser. No. 1851071-9, filed 11 Sep. 2018 in Sweden and which Applications are incorporated herein by reference. To the extent appropriate, a claim of priority is made to each of the above disclosed applications.

FIELD OF INVENTION

The invention relates to a chair comprising a back rest, two rear legs and a third part comprising two corner pieces.

The invention also relates to a kit of parts being configured to be assembled into a chair, the kit of parts comprising a back rest, two rear legs and a third part comprising two corner pieces.

TECHNICAL BACKGROUND

A chair is typically formed by two elongate members extending side by side and each forming a rear leg and a side post of a back rest of the chair. The two elongate members are typically glued or screwed to a seat frame. Two front legs are also glued or screwed to the seat frame.

However, there are occasions where it would be desirable to have the back rest manufactured separately from the rear legs of the chair.

There are a number of different prior art documents where a back rest is separate from the rear legs of the chair.

U.S. Pat. No. 7,040,607 B2 e.g. discloses a bar stool formed of a great number of pieces. The back rest is formed with two side posts a back rest plate and a lower cross bar between the two side posts. The two front legs are each formed as a curved member and is each intended to be connected to the lower cross bar of the back rest. The curved portion of the two front legs are crossed and interconnected underneath the seat of the chair and thereby forms a seat support together with the cross bar of the back rest. The two posts of the back rest are each provided with a tubular end portion being intended to extend into a tubular upper end portion of respective rear leg. Each rear leg is bolted in place by two bolts each extending through a through-going hole in the wall of the tubular portion of the rear leg and into a threaded hole of the tubular end portion of the back rest. It may be noted that the assembly of the bar stool involves a great number of measures before the bar stool is assembled.

DE 197 46 304 A1 discloses a chair with a back rest and rear legs formed of separate members. The back rest ends in two tubular portions being intended to extend into a tubular upper end portion of respective rear leg. Each rear leg is bolted in place by two bolts each extending through through-going holes through both walls of the tubular portion of the rear leg and through through-going holes through both walls of the tubular end portion of the back rest. The two bolts are screwed into a cross-member of the seat frame of the chair. It may be noted that this interconnection system sets specific requirements on the parts forming the chair, such as the use of metallic tubular rear legs, and that the interconnection system also incorporates the use of an adapter inside the tubular portion of the rear leg.

US 2003/0052524 A1 discloses an interconnection system for interconnection of a wooden back rest to a wooden chair with wooden legs. The interconnection system is formed of a tubular member which is trained over an upper portion of the respective rear leg and which is configured to receive a lower end portion of the associated side post of the back rest. The upper portion of the rear leg and the lower end portion of the side post are force fitted into the tubular member. This force fitting requires application of a great force and such a force fitted interconnection system often loosen its grip over time as the wooden pieces dries and shrinks.

Thus, there is still a need for an improved design which allows a back rest to be manufactured separately from the rear legs of the chair and which still is capable of providing easy assembly and a strong interconnection of the different parts forming the chair.

SUMMARY OF INVENTION

It is an object of the invention to provide a design for an interconnection of different parts of a chair, which design e.g. could be used to allow a back rest to be manufactured separately from the rear legs of the chair, and which interconnection is capable of providing easy assembly and a strong interconnection of the parts forming the chair.

This object has been achieved by a chair comprising a back rest, two legs, and a third part comprising two corner pieces, wherein the back rest comprises a first elongated connection member connecting with a first leg of the chair, and a second elongated connection member connecting with a second leg of the chair, wherein the respective elongated connection member has an extension from the back rest along a longitudinal direction to a free end of the elongated connection member, wherein the respective elongated connection member is provided with a hole extending along a crossing direction having a main component orthogonal to the longitudinal direction and being provided with an interconnecting portion, wherein the respective leg is provided with a first bore extending along the longitudinal direction and a second bore extending along the crossing direction and connecting with the first bore, wherein the first bore is configured to receive a portion of the elongated connection member by a relative movement of the respective elongated connection member along the longitudinal direction into the first bore to such an extent that the hole of the elongated member is in register with the second bore of the second part, wherein the respective corner piece is provided with a through-going hole or recess being configured to be in register with the hole of the respective elongated member and the second bore of the respective leg, wherein the chair further comprises a first and a second fastening arrangement each having a head and an elongated part, the respective head directly or indirectly abutting a first side of the respective corner piece, the first side facing away from the respective leg, and the respective elongated part extending through the respective through-going hole or recess and through the second bore and into the hole of the respective elongated connection member, the elongated part having an engaging portion interacting with the interconnecting portion of the hole of the elongated connection member and thereby interconnecting the back rest, the respective leg and the respective corner piece, and wherein the respective corner piece comprises an abutment portion with one or more abutment surfaces configured to interact with one or more abutment surfaces of an abutment portion of the second part, the abutment portions having an extension along the longitudinal direction and an extension along a direction transverse to the longitudinal direction.

It may be said that the back rest, the leg and the corner piece are interconnected by the fastening arrangement forcing the respective corner piece towards the respective leg by drawing the respective elongated connection member of the back rest towards the respective corner piece while the respective elongated connection member is received in the first bore in the respective leg.

All the pieces are easily assembled simply by inserting the elongated connection member into the bore of the leg and positioning them such that the fastening arrangement may be inserted through the respective corner piece and be interconnected with the interconnecting portion of the hole of the respective elongated connection member. The fastening arrangement is tightened and the interconnection is completed. The interconnecting portion may e.g. be a threaded portion or a grooved portion (forming a first part of a bayonet coupling). The fastening arrangement may e.g. be a bolt with the elongated part being fully or partly threaded. The fastening arrangement may be a body provided with one or more pins interacting with the grooves thereby forming a second part of a bayonet coupling. It may be noted that the fastening arrangement may be a one part or be formed of several separate parts. The one-part embodiment may be in the form of an integrally formed part with the elongated part and the head being fixed relative to each other, such as in a bolt. The one-part embodiment may be in the form of a part formed of several sub-parts that are interconnected and handled as a single part but where the head and the elongated part may be moved relative to each other, such in a pin with a locking ring or locking wing. One example of a fastening arrangement formed of several separate parts is a fastening arrangement where the elongated part is formed of a threaded pin and the head is formed of a nut threadingly interacting with the threaded pin.

By the third part comprising an abutment portion with one or more abutment surfaces configured to interact with one or more abutment surfaces of an abutment portion of the second part, the abutment portions having an extension along the longitudinal direction and an extension along a direction transverse to the longitudinal direction there is provided a good stabilising of the respective leg relative to the respective corner piece. It may be noted that having an extension along the longitudinal direction and along a direction transverse to the longitudinal direction does not necessarily mean that the abutment surface(-s) is/are planar. In a preferred embodiment the respective abutment surface is generally planar. However, the abutment surfaces may have other shapes, such as curved, step-shaped, etc. thereby having an extension also along a direction being normal to the plane defined by said longitudinal direction and a direction transverse to the longitudinal direction. It may be noted that this may also be useful for a circular leg, such as a circular cylindrical or circular conical leg. Along the circumference of the circular leg there will at a first circumferential position be a part of the circular surface having a tangential direction along a first direction being transverse to the longitudinal direction and there will at a second circumferential position be a part of the circular surface having a tangential direction along a second direction also being transverse to the longitudinal direction. As mentioned above, the abutment surfaces may at these circumferential positions be flat or be curved to provide a larger abutment surface by following the curvature at these circumferential positions.

The through-going hole or recess of the respective corner piece may according to one embodiment be a through-going hole in which the fastening arrangement, preferably a bolt, is inserted along the axial direction of the elongated portion. The through-going recess may be seen as a through-going hole with material otherwise forming a portion of the inside envelope surface being removed. A through-going recess may be designed such that the bolt may be inserted into the recess by a movement in a direction transverse to the axial direction of the bolt. Such a design allows for the back rest and respective leg being pre-assembled and partly interconnected by the bolt before the back rest and respective leg are connected to the respective corner piece.

Preferred embodiments appear in the dependent claims and in the description.

The interconnecting portion of the respective elongated connection member and/or the engaging portion of the respective fastening arrangement may comprise inclined abutment surface, the abutment surfaces being inclined as seen around the crossing direction, whereby rotation of the engaging portion relative to the elongated connection member about the crossing direction moves the fastening arrangement relative to the elongated connection member along the crossing direction. Examples of such inclined abutment surfaces are threads and the grooves of bayonet couplings.

The interconnecting portion of the respective elongated connecting member is preferably a threaded portion. The threaded portion of the hole in the elongated connection member may have basically any extension, but preferably has an extension along at least 75% of the hole as seen along the crossing direction. This way the cross-dimension of the elongated connection member and the length of the hole is used to a large extent to transmit forces. The hole may be threaded along its full length in the elongated connection member. The hole may be extending through the elongated connection member. This facilitates production of the hole and the threads and it also makes it possible to make the most out of the available dimensions when it comes to transmitting forces.

The respective elongated connection member may have a free end portion between the hole and the free end, the free end portion having a length along the longitudinal direction being at least three times, preferably at least five times, a mean diameter of the hole. This aids in stabilising the second part relative to the first part.

The abutment portions of the respective corner piece and/or of the respective leg respectively may comprise a first abutment surface and a second abutment surface both having an extension along the longitudinal direction, wherein the first and second abutment surfaces form an angle relative to each other in a plane in which the longitudinal direction forms normal direction. By the abutment surfaces forming an angle, the leg may be received in a seat formed by the corner piece, thereby stabilising the leg relative to the corner piece.

The through-going hole or recess may be positioned relative to the first and second abutment surfaces of the respective corner piece such that the elongated part of the fastening arrangement extends into a geometrical sector volume defined by the first abutment surface on one side and the second abutment surface on the other hand and such that the elongated part of the respective fastening arrangement forms an angle relative to the first abutment surface and an angle relative to the second abutment surface in a plane in which the longitudinal direction forms normal direction.

Thereby the bolt may forcefully draw the respective leg into the seat formed by the abutment portion of the respective corner piece.

The through-going hole or recess may extend through or nearby a geometrical intersection between the first and second abutment surfaces.

Thereby the fastening arrangement, such as a bolt, may forcefully draw the respective leg into the seat formed by the abutment portion of the respective corner piece. Nearby may e.g. be that the shortest distance between the through-going hole or recess and the intersection is smaller than two times, preferably smaller than one time, a smallest diameter of the elongated part of the bolt. It may be noted that the through-going hole or recess may be said to extend through the intersection even though a centre line of the through-going hole or recess is positioned slightly offset relative to the geometrical intersection. The through-going hole or recess may be positioned such that a centre line of the through-going hole or recess extends through the geometrical intersection. In a preferred embodiment the axial direction of the bolt bisects the angle between the first and second abutment surfaces. Thereby the bolt may be subjected to pure axial force when it is used to clamp together the respective elongated connection member of the back rest, the respective leg, and the respective corner piece.

The abutment portions of the respective leg and/or respective corner piece may respectively extend along the longitudinal direction a distance in both directions from through-going hole or recess being at least equal to, preferably being two times, a mean diameter of the threaded portion of the hole. This aids in stabilising the respective leg relative to the third part.

It may be noted that the extension of the abutment surfaces may, but need not, be such that there is an abutment all the way from the through-going hole or recess to the outer most portion of the abutment portion. The abutment portion may e.g. be configured with a recessed surfaces portion close to the through-going hole or recess and be provided with more protruding abutment surfaces forming a contour about and at a distance from the through-going hole or recess.

In accordance with one embodiment, the through-going hole or recess of the respective corner piece is a through-going hole. A through-going hole is often easy to manufacture. It also facilitates assembly in the sense that it is secured that the bolt is in the intended position. The use of a through-going hole also makes the third part strong since there is material all around the hole.

The respective elongated connection member may be formed of a metallic material. Also, the respective fastening arrangement may be formed of a metallic material. It may be noted that they may, but need not, be formed of the same metallic material. Metallic materials are preferred since they may be provided with strong threads and still have small dimensions. The overall design of the interconnection systems allows for the other parts to be produced using a wide variety of materials.

The respective corner piece may be formed of a metallic material. The respective corner piece may e.g. form or at least form part of a corner portion of a frame. By designing the third part in a metallic material, especially in combination with the bolt and the elongated connection member also being of a metallic material, it is possible to provide a strong interconnection with small dimensions and still allowing e.g. the legs and the posts of the back rest to be produced from wood. Preferably, the corner piece comprising the through-going hole or recess and the abutment portion with one or more abutment surfaces configured to interact with one or more abutment surfaces of an abutment portion of the respective leg, the abutment portions having an extension along the longitudinal direction and an extension along a direction transverse to the longitudinal direction, is integrally formed of a single piece of material, preferably a metallic material.

The back rest may comprise a first elongated connection member connecting with a first leg of the chair by a first fastening arrangement, such as a bolt, extending through a first through-going hole or recess in the seat frame, and a second elongated connection member connecting with a second leg of the chair by a second fastening arrangement, such as a bolt, extending through a second through-going hole or recess in the seat frame.

The invention may alternatively in short be said to relate to a furniture comprising a first part, a second part, and a third part. In the context of the chair, the back rest may form the first part, a rear leg may form the second part, and the seat frame or a part, such as a corner piece, connected to the seat frame may form the third part. It may be noted that there will be formed a first interconnection according to the invention at the first rear leg and a second interconnection also according to the invention at the second rear leg of the chair.

The invention may alternatively in short be said to relate to a chair comprising a back rest, two legs, and a third part comprising two corner pieces, wherein the back rest comprises two elongated connection members each provided with a hole extending along a crossing direction and being provided with an interconnecting portion, wherein the respective leg is provided with a first bore extending along the longitudinal direction and a second bore extending along the crossing direction and connecting with the first bore, wherein the first bore is configured to receive a portion of the respective elongated connection member, wherein the respective corner piece is provided with a through-going hole or recess being configured to be in register with the hole of the respective elongated member and the second bore, wherein the chair further comprises a first and a second fastening arrangement each having a head and an elongated part extending through the through-going hole or recess and through the second bore and into the hole of the respective elongated connection member, the respective elongated part threadingly interacting with the threads of the hole of the respective elongated connection member and thereby interconnecting the back rest, the legs and the corner pieces.

According to a further aspect of the invention there is also provided a kit of parts being configured to be assembled into a chair, the kit of parts comprising a back rest, two legs, a third part comprising two corner pieces, and a first and a second fastening arrangement, wherein the back rest comprises a first elongated connection member configured to be connected with a first leg of the chair, and a second elongated connection member being configured to be connected with a second leg of the chair, wherein respective elongated connection member has an extension from the back rest along a longitudinal direction to a free end of the elongated connection member, wherein the respective elongated connection member is provided with a hole extending along a crossing direction having a main component orthogonal to the longitudinal direction and being provided with an interconnecting portion, wherein the respective leg is provided with an first bore extending along a longitudinal direction and a second bore extending along a crossing direction having a main component orthogonal to the longitudinal direction and connecting with the first bore, wherein the first bore is configured to receive a portion of the respective elongated connection member by a relative movement of the elongated connection member along the longitudinal direction into the first bore to such an extent that the hole of the elongated member is in register with the second bore, wherein the respective corner piece is provided with a through-going hole or recess being configured to be in register with the hole of the respective elongated member and the second bore of the respective leg, wherein the respective fastening arrangement has a head and an elongated part, the respective head being configured to directly or indirectly abut a first side of the respective corner piece, the first side being configured to face away from the respective leg, and the respective elongated part being configured to extend through the respective through-going hole or recess and through the second bore and into the hole of the respective elongated connection member, the elongated part having an engaging portion being configured to interact with the interconnecting portion of the hole of the elongated connection member and thereby interconnecting the back rest, the respective leg and the respective corner piece, wherein the respective corner piece comprises an abutment portion with one or more abutment surfaces configured to interact with one or more abutment surfaces of an abutment portion of the respective leg, the abutment portions having an extension along the longitudinal direction and an extension along a direction transverse to the longitudinal direction.

The kit of parts is basically characterised by the same features as the seating furniture discussed above. The advantages associated with the respective features are the basically the same as in the context of the seating furniture and reference is made to the discussion of the features and associated advantages presented above.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

Figures 1, 2:
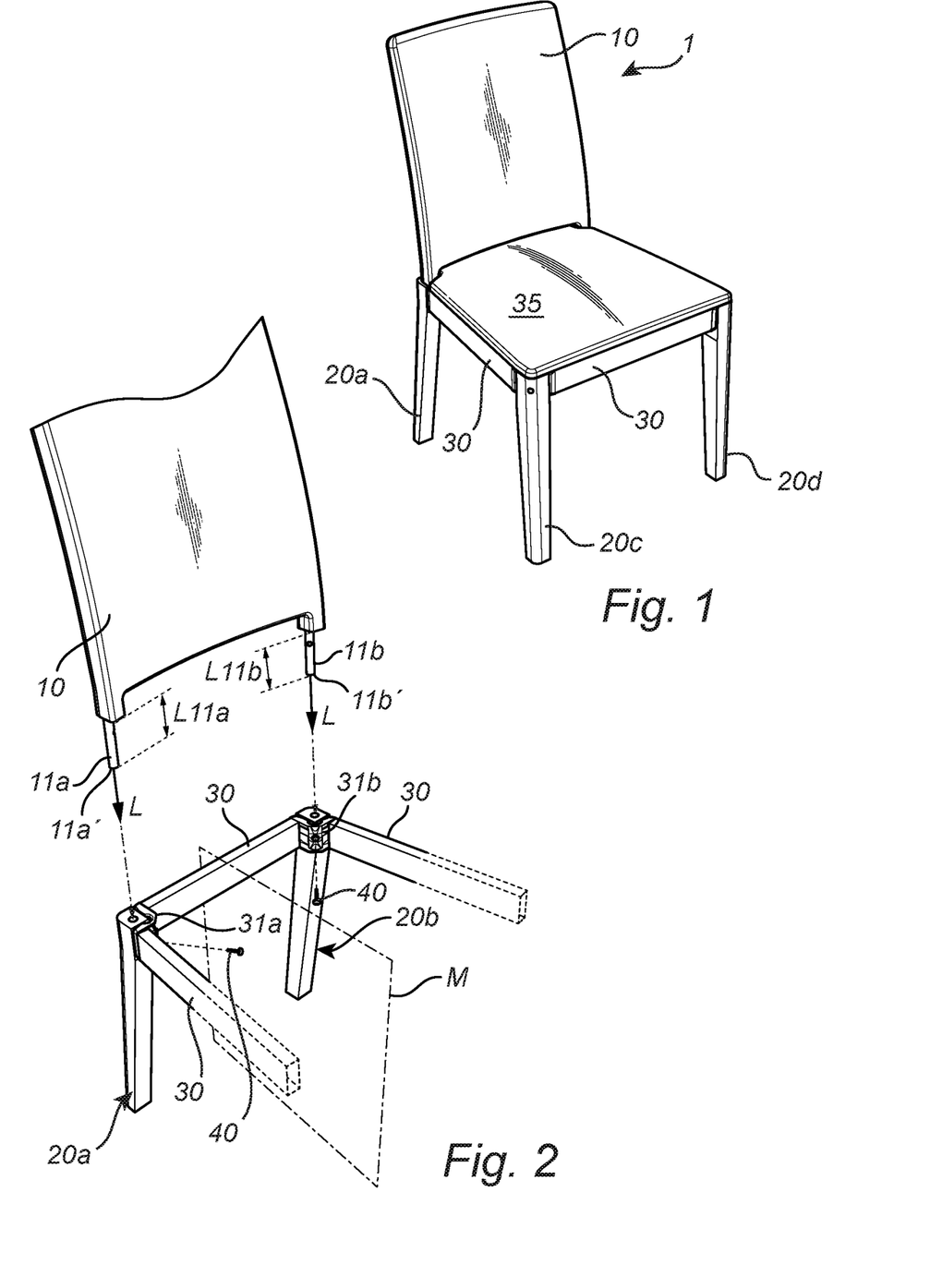
FIG. 1 depicts a chair in which the inventive concept is applied.
FIG. 2 is an exploded view of a part of the chair of FIG. 1.

As shown in the figures, the inventive concept may be used in a chair 1. With reference to FIGS. 1 and 2, the chair 1 comprises a back rest 10, two rear legs 20*a-b*, and a seat frame 30. The seat frame 30 may support, or be integrally formed with, a chair seat 35. The seat frame 30 is further connected to two front legs 20*c-d*.

In the description below there will sometimes in general terms be referred to a furniture comprising a first part 10, a second part 20*a*, 20*b*, and a third part 30 and sometimes there will in more specific details be referred to the chair 1, wherein the back rest 10 forms the first part, a rear leg 20*a* or 20*b* forms the second part, and the seat frame 30 or a part, such as a corner piece, connected to the seat frame 30 forms the third part. It may be noted that there will be formed a first interconnection according to the invention at the first rear leg 20*a* and a second interconnection also according to the invention at the second rear leg 20*b*.

Figure 4A:
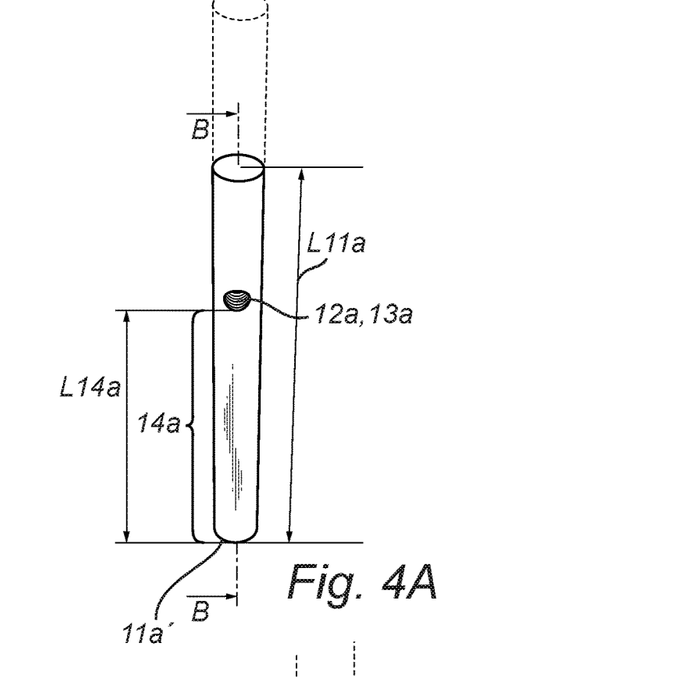
FIG. 4A depicts an elongated connection member and FIG. 4B is a cross-section along line B-B in FIG. 4A.
Figure 6A:
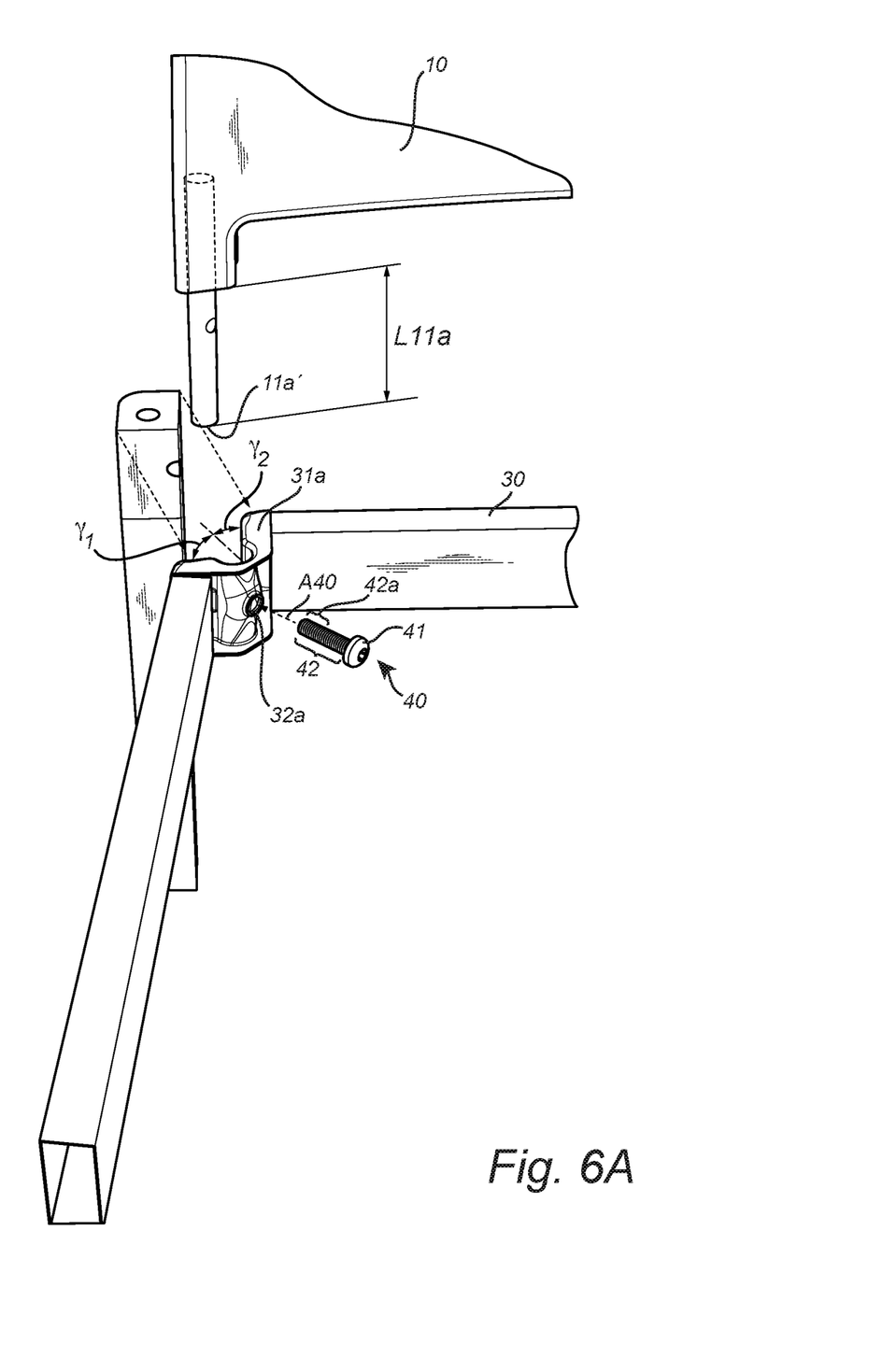
FIGS. 6A-D discloses different steps of a method of assembling the chair.

The back rest 10 comprises an elongated connection member 11*a*, 11*b* having an extension L11*a*, L11*b* from the back rest 10 along a longitudinal direction L to a free end 11*a'*, 11*b'* of the elongated connection member 11*a*, 11*b*. As indicated in FIGS. 4A and 6A, the elongated connection member 11*a*, 11*b* may be a separate member attached to the first part 10 (the back rest) by having an extension indicated by the dashed lines into the back rest 10. The elongated connection members 11*a*, 11*b* may be attached to the back rest 10 using a number of different attachment methods, they may be inserted into a bore in the back rest and be held in place using an interference fit, glue, threads, etc. Alternatively, the elongated connection members 11*a*, 11*b* may be said to be a more integrated part of the back rest 10. The elongated connection members 11*a*, 11*b* may e.g. be opposing ends of a single member being curved inside the back rest 10.

Figure 4B:
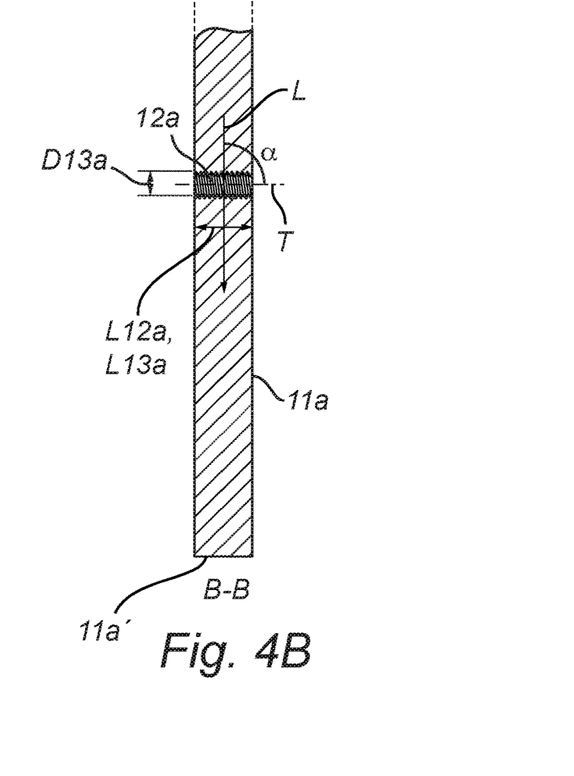

As is best shown in FIGS. 4A and 4B, the elongated connection member 11*a* is provided with a hole 12*a* extending along a crossing direction T. The crossing direction T forms an angle α with the longitudinal direction L. The crossing direction has at least a main component orthogonal to the longitudinal direction L. In the preferred embodiment, the crossing direction T is orthogonal to the longitudinal direction L. As is shown e.g. in FIGS. 4A, 4B and 6B-D, the hole 12*a* is provided with a threaded portion 13*a*. It may be noted that the hole 12*a* may, but need not, be threaded through-out its length L12*a*. As shown in the figures, the other elongated connection member 11*b* is similarly designed with an at least partly threaded hole extending in a second crossing direction relative to the longitudinal direction. Although it not being necessary, it is preferred that the elongated connection members 11*a*, 11*b* are designed as mirror copies of each other, the members 11*a*, 11*b* being mirrored about a geometrical symmetry plane M extending in a vertical direction and extending in a back to front direction being orthogonal to the distance between the members 11*a*, 11*b*, and being located mid between the two members 11*a*, 11*b*.

Figure 3:
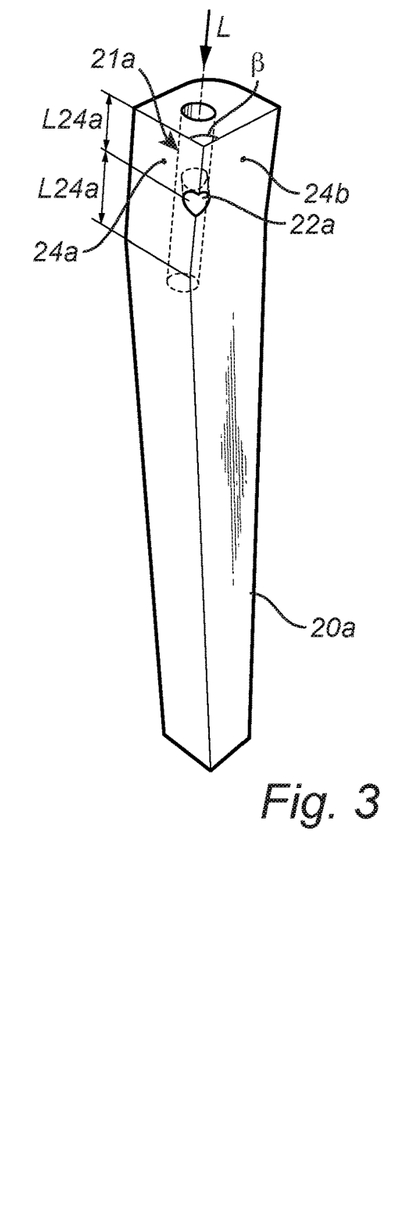
FIG. 3 depicts one of the rear legs of the chair.
Figure 6B:
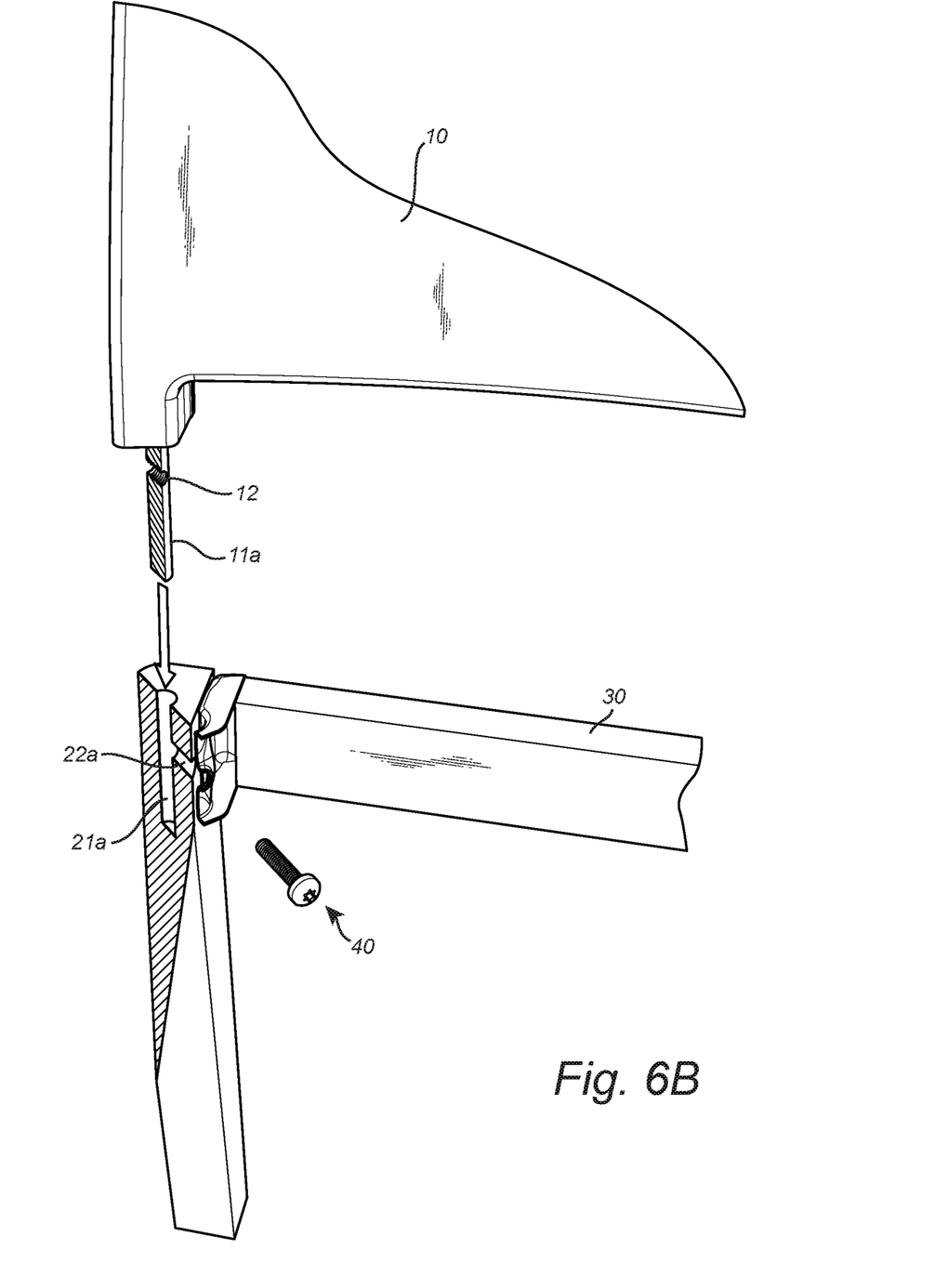
Figure 6C:
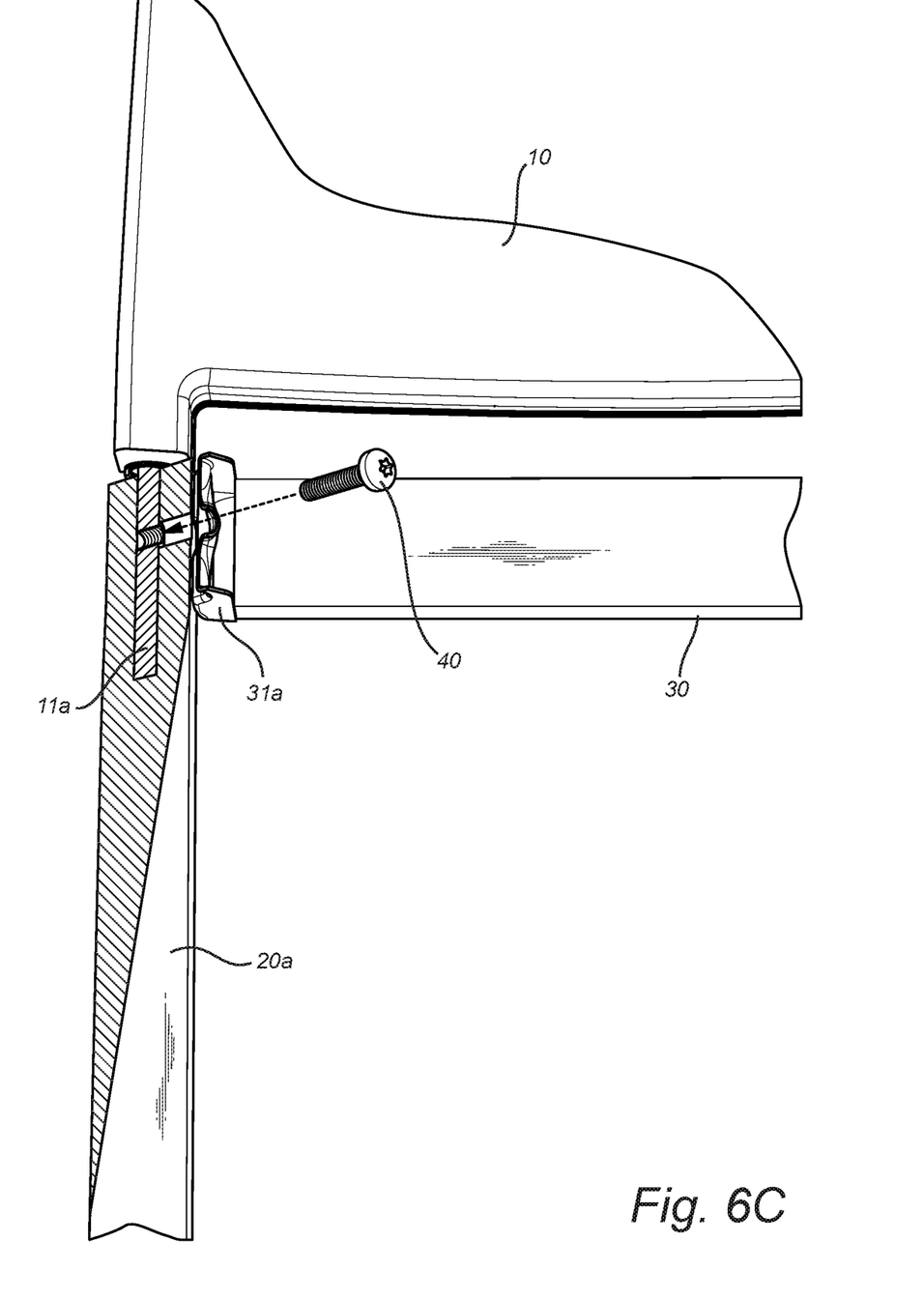
Figure 6D:
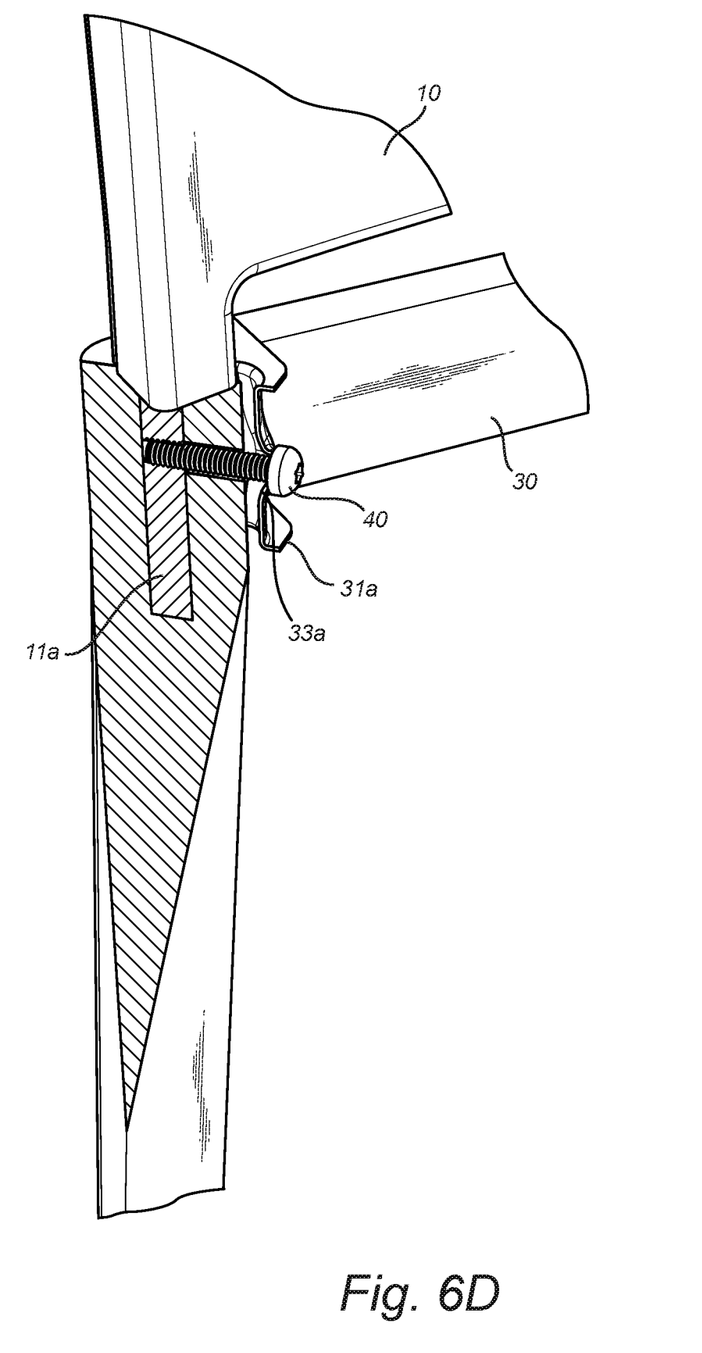

As is shown in FIG. 3 and also in FIGS. 6B-6D, the rear leg 20*a* is provided with a first bore 21*a* extending along the longitudinal direction L and a second bore 22*a* extending along the crossing direction T and connecting with the first bore 21*a*. The first bore 21*a* is configured to receive a portion of the elongated connection member 11*a* by a relative movement of the elongated connection member 11*a* along the longitudinal direction L into the first bore 21*a* to such an extent that the hole 12a of the elongated member 11a is in register with the second bore 22a. As shown in the figures, the other rear leg 20b is also provided with a first bore 21b extending along the longitudinal direction L and a second bore 22b extending along a crossing direction and connecting with the first bore 21b. The first bore 21b is configured to receive a portion of the elongated connection member 11b by a relative movement of the elongated connection member 11b along the longitudinal direction L into the first bore 21b to such an extent that the hole 12b of the elongated member 11b is in register with the second bore 22b. Although it not being necessary, it is preferred that the rear legs 20a, 20b are designed as mirror copies of each other, the rear legs 20a, 20b being mirrored about the geometrical symmetry plane M extending in a vertical direction and extending in a back to front direction being orthogonal to the distance between the rear legs 20a, 20b and being located mid between the two rear legs 20a, 20b.

As e.g. shown in FIGS. 2, 5A-B, and 6A, the third part is in the disclosed embodiment formed of a corner piece 31a forming part of the frame 30. The third part, e.g. formed by the frame 30 or the corner piece 31a, is provided with a through-going hole 32a or recess 32a' (as shown in the alternative embodiment 31a' of FIG. 5C) being configured to be in register with the hole 12a of the elongated member 11a and the second bore 22a. As shown in the figures, the other rear corner of the seat frame 30 is also provided with a corner piece 31b. Also this corner piece 31b is provided with a through-going hole 32b or recess. Although it not being necessary, it is preferred that the corner pieces 31a, 31b are designed as mirror copies of each other, the corner pieces 31a, 31b being mirrored about the geometrical symmetry plane M extending in a vertical direction and extending in a back to front direction being orthogonal to the distance between the corner pieces 31a, 31b and being located mid between the two corner pieces 31a, 31b.

As shown in FIGS. 6A-D, the furniture further comprises a bolt 40 having a head 41 and an elongated part 42. As shown in FIGS. 6A-C, the elongated part 42 is configured to be inserted through the through-going hole 32a or recess 32a' such that the elongated part 42 extends through the through-going hole 32a or recess 32a' and through the second bore 22a and into the hole 12a of the elongated connection member 11a. Likewise is at the other rear corner another bolt, having a head and an elongated part, configured to be inserted through the through-going hole or recess such that the elongated part extends through the through-going hole or recess and through the second bore and into the hole of the elongated connection member 11b.

In the following the details will be disclosed with reference to the parts provided at the corner where the elongated member 11a forms part of the interconnection. The details are equally applicable to the parts provided at the corner where the elongated member 11b forms part of the interconnection.

As shown in FIG. 6D, the bolt 40 is inserted until the head 41 directly or indirectly (such as with a washer between the head 41 and the corner piece 31) abutting a first side 33a of the third part 31a, the first side 33a facing away from the second part 20a. In the preferred embodiment, the first side is provided with a distinct abutment surface 33a forming a rim around the through-going hole 32a.

As e.g. shown in FIG. 6A, the elongated part 42 has a threaded portion 42a forming an engaging portion configured to threadingly interact with the threads 13a of the hole 12a of the elongated connection member 11a and thereby interconnect the first 10, second 20a and third part 30, 31a.

In the disclosed embodiment, the bolt 40 is of a kind having threads along basically the complete elongated portion 42. However, the elongated portion 42 may alternatively be provided with threads only at a portion actually interacting with the hole 12 of the elongated connecting member 11a, 11b. Thus the elongated portion 42 may be provided with threads only along the engaging portion 42a.

It may be said that the first 10, second 20a and third parts 30, 31a are interconnected by the bolt 40 forcing the third part 30, 31a towards the second part 20a by threadingly drawing the elongated connection member 11a of the first part 10 towards the third part 30, 31a while the elongated connection member 11a is received in the first bore 21a in the second part 20a.

Figure 5A:
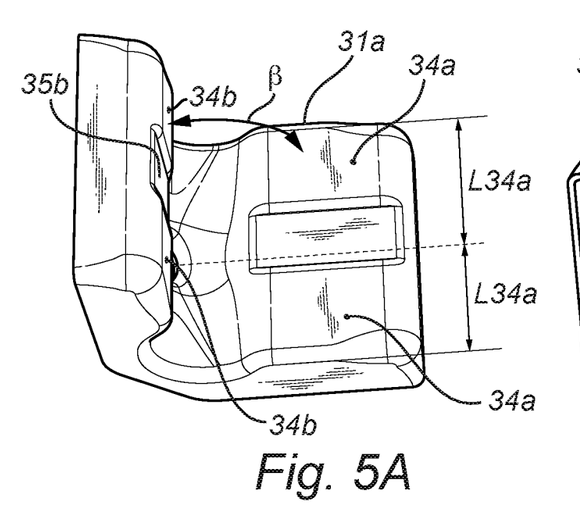
FIGS. 5A and 5B an inside view and an outside view, respectively, of a corner piece of a chair frame.
Figure 5B:
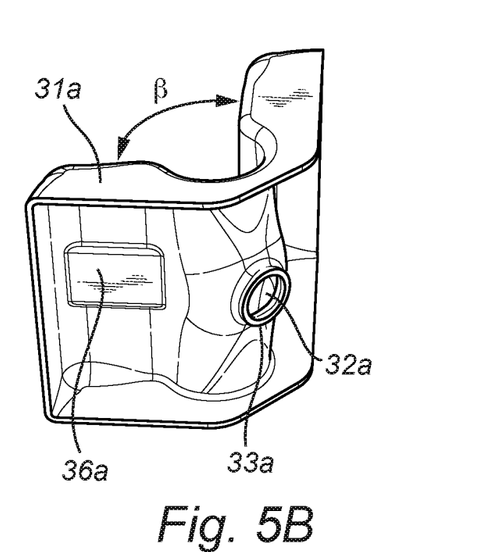
Figure 5C:
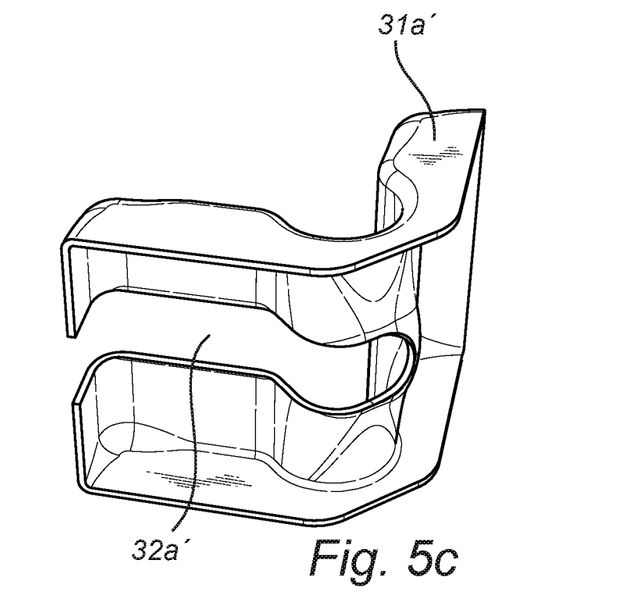
FIG. 5C discloses an alternative embodiment.

As shown in FIG. 5C, the through-going hole or recess of the third part may be through-going recess which may be seen as a through-going hole with material otherwise forming a portion of the inside envelope surface being removed. A through-going recess may be designed as in FIG. 5C where the bolt may be inserted into the recess by a movement in a direction transverse to the axial direction of the bolt. Such a design allows for the first and second part being pre-assembled and partly interconnected by the bolt before the first and second parts are connected to the third part.

The threaded portion 13a of the hole 12a in the elongated connection member 11a may have an extension L13a along at least 75% of the hole 12a as seen along the crossing direction T. In the design shown in the figures, the hole 12a is threaded along its full length in the elongated connection member 11a. Although it not being necessary, in the preferred embodiment the hole 12a extends through the elongated connection member 11a. This facilitates production of the hole and the threads and it also makes it possible to make the most out of the available dimensions when it comes to threadingly transmitting forces.

The elongated connection member 11a has a free end portion 14a between the hole 12a and the free end 11a'. The free end portion 14a has a length L14a along the longitudinal direction L being at least three times, preferably at least five times, a mean diameter D13a of the threaded portion 13a of the hole 12a. The length L14a is about the same as the free length between the hole 12a and the point where the elongated connection member 11a enters into the back rest 10. Thus, the length L14a is about half the length L11a. Preferably the length L14a is about half the length L11a+/−20%, and more preferably the length L14a is about half the length L11a+/−10%.

The third part 31a comprises an abutment portion with one or more abutment surfaces 34a, 34b configured to interact with one or more abutment surfaces 24a, 24b of an abutment portion of the second part 20a.

The abutment portions of the third part 31a and of the second part 20a have both an extension along the longitudinal direction L and an extension along a direction transverse to the longitudinal direction. In a preferred embodiment the respective abutment surface 24a-b, 34a-b is generally planar. The abutment portions of the third part 31a and/or of the second part 20a respectively may comprise a first abutment surface 24a, 34a and a second abutment surface 24b, 34b both having an extension along the longitudinal direction L, wherein the first and second abutment surfaces 24a-b, 34a-b form an angle β relative to each other in a plane in which the longitudinal direction L forms normal direction. In the preferred embodiment, the angle β is 90°.

As shown e.g. in FIGS. 5A-B and 6A, the through-going hole 32a or recess is positioned relative to the first and second abutment surfaces 34a-b of the third part 31a such that the elongated part 42 of the bolt 40 extends into a geometrical sector volume defined by the first abutment surface 34a on one side and the second abutment surface 34b on the other hand and such that the elongated part 42 of the bolt 40 form an angle γ1 relative to the first abutment surface 34a and an angle γ2 relative to the second abutment surface 34b in a plane in which the longitudinal direction L forms normal direction. As shown in the figures, the through-going hole 32a or recess extend through a geometrical intersection between the first and second abutment surfaces 34a-b. In the preferred embodiment the axial direction A40 of the bolt 40 bisects the angle β between the first and second abutment surfaces 34a-b, i.e. the angle γ1 is equal to the angle γ2 where both angles γ1 and γ2 is equal to half the angle β.

The abutment portions of the second 20a and/or third part 31a may respectively extend along the longitudinal direction L a distance L24a, L34a in both directions from the through-going hole 32a or recess being at least equal to, preferably being two times, a mean diameter D13a of threaded portion 13a of the second bore 12a.

It may be noted that the extension of the abutment surfaces may, but need not, be such that there is an abutment all the way from the through-going hole or recess to the outer most portion of the abutment portion. The abutment portion may e.g. be configured with a recessed surfaces portion close to the through-going hole or recess and be provided with more protruding abutment surfaces forming a contour about and at a distance from the through-going hole or recess. In FIG. 5A, there is e.g. disclosed recessed portions 35a, 35b. Such portions may be used to provide a reinforcing rib 36a by having an extension offset the abutment surface 34a.

The elongated connection member 11a, 11b is preferably formed of a metallic material. The bolt 40 is preferably formed of a metallic material. It may be noted that they may, but need not, be formed of the same metallic material. Metallic materials are preferred since they may be provided with strong threads and still have small dimensions. The overall design of the interconnection systems allows for the other parts to be produced using a wide variety of materials. The second part 20a, 20b may e.g. be formed of wood. It may alternatively be formed of a metallic material.

The third part 31a is preferably formed of a metallic material. In an alternative embodiment, the third part 30a is formed of wood, In such a design it is preferred that there is provided a metallic washer between the head of the bolt and the third part. It may be noted that wood need not only refer to solid natural wood, it may also refer to wood based material, such as materials where the wood has been shredded into small fragments and then pressed/glued together to again form a solid piece of material.

As shown in FIG. 6A, the first part 10, the second part 20a, the third part 30 and the bolt 40 could conceivably be provided as a kit of parts being configured to be assembled into a furniture, such as the chair 1.

It is contemplated that there are numerous modifications of the embodiments described herein, which are still within the scope of the invention as defined by the appended claims.

The invention claimed is:

1. Chair comprising a back rest, two legs, and a third part comprising two corner pieces,
    wherein the back rest comprises a first elongated connection member connecting with a first leg of the chair, and a second elongated connection member connecting with a second leg of the chair,
    wherein the respective elongated connection member has an extension from the back rest along a longitudinal direction to a free end of the elongated connection member,
    wherein the respective elongated connection member is provided with a hole extending along a crossing direction having a main component orthogonal to the longitudinal direction and being provided with an interconnecting portion,
    wherein the respective leg is provided with a first bore extending along the longitudinal direction and a second bore extending along the crossing direction and connecting with the first bore, wherein the first bore is configured to receive a portion of the respective elongated connection member by a relative movement of the elongated connection member along the longitudinal direction into the first bore to such an extent that the hole of the elongated member is in register with the second bore,
    wherein the respective corner piece is provided with a through-going hole or recess being configured to be in register with the hole of the respective elongated member and the second bore of the respective leg,
    wherein the chair further comprises a first and a second fastening arrangement each having a head and an elongated part,
    the respective head directly or indirectly abutting a first side of the respective corner piece so that the elongated part of the respective fastening arrangement extends from the head, through the through-going hole or recess of the respective corner piece, then through the second bore of the respective leg, and into the hole of the respective elongated member,
    the elongated part having an engaging portion interacting with the interconnecting portion of the hole of the elongated connection member and thereby interconnecting the backrest, the respective leg and the respective corner piece, and
    wherein the respective corner piece comprises an abutment portion with two or more abutment surfaces configured to interact with two or more abutment surfaces of an abutment portion of the respective leg, the abutment portions having an extension along the longitudinal direction and an extension along a direction transverse to the longitudinal direction.

2. Chair according to claim 1, wherein the interconnecting portion of the respective elongated connection member and/or the engaging portion of the respective fastening arrangement comprises abutment surfaces being inclined as seen around the crossing direction, whereby rotation of the engaging portion relative to the elongated connection member about the crossing direction moves the fastening arrangement relative to the elongated connection member along the crossing direction.

3. Chair according to claim 1, wherein the interconnecting portion of the respective elongated connecting member is a threaded portion, wherein the threaded portion of the hole in the elongated connection member has an extension along at least 75% of the hole as seen along the crossing direction.

4. Chair according to claim 1, wherein the respective elongated connection member has a free end portion between the hole and the free end, the free end portion having a length along the longitudinal direction being at least three times a mean diameter of the hole.

5. Chair according to claim 1, wherein the abutment portion of the respective corner piece and/or of the respective leg respectively comprises a first abutment surface and a second abutment surface both having an extension along the longitudinal direction, wherein the first and second abutment surfaces form an angle relative to each other in a plane in which the longitudinal direction forms normal direction.

6. Chair according to claim 5, wherein the through-going hole or recess is positioned relative to the first and second abutment surfaces such that the elongated part of the respective fastening arrangement extends into a geometrical sector volume defined by the first abutment surface on one side and the second abutment surface on an opposing side and such that the elongated part of the respective fastening arrangement forms an angle relative to the first abutment surface and an angle relative to the second abutment surface in a plane in which the longitudinal direction forms normal direction.

7. Chair according to claim 5, wherein the through-going hole or recess extends through or nearby a geometrical intersection between the first and second abutment surfaces.

8. Chair according to claim 5, wherein the abutment portions of the respective leg and/or the respective corner piece, respectively extends along the longitudinal direction a distance in both directions from through-going hole or recess being at least equal to a mean diameter of the hole.

9. Chair according to claim 1, wherein the through-going hole or recess of the respective corner piece is a through-going hole.

10. Chair according to claim 1, wherein the respective elongated connection member is formed of a metallic material.

11. Chair according to claim 1, wherein the respective corner piece is formed of a metallic material.

12. Kit of parts being configured to be assembled into a chair, the kit of parts comprising:
   a back rest, two legs, a third part comprising two corner pieces, and a first and second fastening arrangement each having a head and an elongated part,
   wherein the back rest comprises a first elongated connection member configured to be connected with a first leg of the chair, and a second elongated connection member being configured to be connected with a second leg of the chair,
   wherein the respective elongated connection member has an extension from the back rest along a longitudinal direction to a free end of the elongated connection member,
   wherein the respective elongated connection member is provided with a hole extending along a crossing direction having a main component orthogonal to the longitudinal direction and being provided with an interconnecting portion,
   wherein the respective leg is provided with a first bore extending along a longitudinal direction and a second bore extending along a crossing direction having a main component orthogonal to the longitudinal direction and connecting with the first bore, wherein the first bore is configured to receive a portion of the respective elongated connection member by a relative movement of the elongated connection member along the longitudinal direction into the first bore to such an extent that the hole of the elongated member is in register with the second bore,
   wherein the respective corner piece is provided with a through-going hole or recess being configured to be in register with the hole of the respective elongated member and the second bore of the respective leg,
   the respective head being configured to directly or indirectly abut a first side of the respective corner piece so that the elongated part of the respective fastening arrangement is configured to extend from the head, through the through-going hole or recess of the respective corner piece, then through the second bore of the respective leg, and into the hole of the respective elongated member,
   the elongated part having an engaging portion being configured to interact with the interconnecting portion of the hole of the elongated connection member and thereby interconnecting the back rest, the respective leg and the respective corner piece, and
   wherein the respective corner piece comprises an abutment portion with two or more abutment surfaces configured to interact with two or more abutment surfaces of an abutment portion of the respective leg, the abutment portions having an extension along the longitudinal direction and an extension along a direction transverse to the longitudinal direction.

* * * * *